United States Patent
Sakamoto et al.

(10) Patent No.: US 6,893,379 B2
(45) Date of Patent: May 17, 2005

(54) HYDRAULIC PRESSURE CONTROL APPARATUS FOR VEHICULAR AUTOMATIC TRANSMISSION AND CONTROL METHOD FOR HYDRAULIC FRICTIONAL ENGAGEMENT DEVICE OF VEHICULAR AUTOMATIC TRANSMISSION

(75) Inventors: Naoyuki Sakamoto, Toyota (JP); Toshimitsu Sato, Toyota (JP); Hisanori Nomoto, Nisshin (JP); Hiromichi Kimura, Okazaki (JP); Toshio Sugimura, Nagoya (JP); Masumi Wada, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/639,649

(22) Filed: Aug. 13, 2003

(65) Prior Publication Data

US 2004/0053745 A1 Mar. 18, 2004

(30) Foreign Application Priority Data

Sep. 12, 2002 (JP) ........................................ 2002-266319

(51) Int. Cl.$^7$ .............................................. F16H 61/26
(52) U.S. Cl. ....................... 477/156; 477/154; 477/155; 477/158; 477/159; 477/160; 477/174; 477/175; 477/65; 477/97; 701/55; 701/67
(58) Field of Search ................................. 477/154, 155, 477/156, 158, 159, 160, 174, 175, 65, 97; 701/55, 67

(56) References Cited

U.S. PATENT DOCUMENTS

| | | | | |
|---|---|---|---|---|
| 5,020,391 A | * | 6/1991 | Aoki et al. .................. | 477/143 |
| 5,443,427 A | * | 8/1995 | Ataka et al. ................. | 475/123 |
| 6,149,547 A | * | 11/2000 | Oba et al. .................... | 477/154 |
| 6,595,888 B1 | * | 7/2003 | Yuasa et al. ................. | 475/118 |

FOREIGN PATENT DOCUMENTS

| | | |
|---|---|---|
| JP | 2001-124192 | 5/2001 |
| JP | 2001-322451 | 11/2001 |

\* cited by examiner

*Primary Examiner*—Saul Rodriguez
*Assistant Examiner*—David D. Le
(74) *Attorney, Agent, or Firm*—Oblon, Spivak, McClelland, Maier & Neustadt, P.C.

(57) ABSTRACT

When it has been determined that control for a predetermined upshift has been started while an accelerator pedal was not being depressed, and that a factor that changes an input torque of an automatic transmission has been generated, an engaging pressure of a predetermined hydraulic frictional engagement device is corrected by a correction amount in accordance with the factor that changes the input torque. As a result, undershooting of an engine speed, as well as shift shock which results from that undershooting, is able to be preferably suppressed.

13 Claims, 10 Drawing Sheets

| POSITION | | CLUTCHES & BRAKES | | | | | | | O.W.C. | |
|---|---|---|---|---|---|---|---|---|---|---|
| | | C1 | C0 | C2 | B1 | B2 | C3 | B3 | F1 | F2 |
| N,P | | X | X | X | X | X | X | O | X | X |
| R | | X | X | O | X | O | X | O | X | X |
| D | 1st | O | X | X | X | X | X | O | O | △ |
| | 2nd | O | X | X | O | X | X | O | X | △ |
| | 3rd | O | O | X | X | X | X | O | X | △ |
| | 4th | X | O | X | O | X | X | O | X | △ |
| | 5th | X | O | X | O | X | O | X | X | X |
| 1stENGINE BRAKE | | O | X | X | X | O | X | O | △ | △ |

HYDRAULIC PRESSURE CONTROL APPARATUS FOR VEHICULAR AUTOMATIC TRANSMISSION AND CONTROL METHOD FOR HYDRAULIC FRICTIONAL ENGAGEMENT DEVICE OF VEHICULAR AUTOMATIC TRANSMISSION

INCORPORATION BY REFERENCE

The disclosure of Japanese Patent Application No. 2002-266319 filed on Sep. 12, 2002, including the specification, drawings and abstract is incorporated herein by reference in its entirety.

BACKGROUND OF THE INVENTION

1. Field of the Invention

The invention relates to a hydraulic pressure control apparatus of a vehicular automatic transmission and a control method for a hydraulic frictional engagement device of a vehicular automatic transmission, which preferably suppress shift shock when a predetermined upshift is executed by increasing an engaging pressure of a predetermined hydraulic frictional engagement device, by correcting the engaging pressure based on generation of a factor that changes an input torque of the transmission during a power-off upshift.

2. Description of the Related Art

JP-A-2001-124192 discloses a hydraulic pressure control apparatus is known that executes a predetermined upshift by increasing the engaging pressure of a predetermined hydraulic frictional engagement device in a vehicular automatic transmission that shifts speeds by selectively engaging a plurality of hydraulic frictional engagement devices. This apparatus performs the six following steps. In the first step, it is determined whether an upshift being performed is a power-off upshift (i.e., an upshift in which the accelerator pedal is not being depressed). When it is determined in the first step that a power-off upshift is being performed, it is then determined in the second step whether all power-off upshift conditions have been fulfilled. When it has been determined in the second step that all power-off upshift conditions have been fulfilled, the apparatus then measures a fluid pressure response time, determines a maximum duty value so as not to force the transmission to shift, and calculates the fluid pressure response time for when that maximum duty value is changed to 100% in the third step. After the fluid pressure response time is calculated in the third step, a shift complete point is then calculated in the fourth step. In the fifth step, it is determined whether the shift complete point calculated in the fourth is in sync with an actual shift complete point that is based on the actual engine speed and turbine rotational speed. When it has been determined in the fifth step that those two points are in sync, the maximum duty value is set to 100% in the sixth step and the shift ends. Completing the shift so that the calculated shift complete point is in sync with the actual shift complete point based on the actual engine speed and the turbine rotational speed enables undershooting of the engine speed, as well as tie-up which is caused by that undershooting, to be preferably suppressed.

With this hydraulic pressure control apparatus for a vehicular automatic transmission, however, when a factor or the like that changes the output torque of the engine due to operation of fuel cut control or air conditioner control or the like is generated, during a power-off upshift, the rate of change in the turbine rotational speed fluctuates. When that rate of change is large, undershooting of the engine speed is generated at a point near synchronous rotation, such that, during synchronized rotation, there is a sudden feeling of deceleration and shift shock.

SUMMARY OF THE INVENTION

The invention thus provides a hydraulic pressure control apparatus for a vehicular automatic transmission and a control method for a hydraulic frictional engagement device of a vehicular automatic transmission, which preferably suppress undershooting of the engine speed, as well as shift shock generated from that undershooting, during a power-off upshift, even when a factor that changes an output torque of the engine is generated.

A first aspect of the invention relates to a hydraulic pressure control apparatus which executes a predetermined upshift by increasing an engaging pressure of a predetermined hydraulic frictional engagement device in a vehicular automatic transmission that shifts speeds by selectively engaging a plurality of hydraulic frictional engagement devices. This hydraulic pressure control apparatus includes a) a first determining device that determines whether control for the predetermined upshift has been started while an accelerator pedal was not being depressed, b) a second determining device that determines whether a factor that changes the input torque of the automatic transmission has been generated, and c) a controller that corrects the engaging pressure of the predetermined hydraulic frictional engagement device by a correction amount in accordance with the factor that changes the input torque when i) it has been determined by the first determining device that the control for the predetermined upshift has been started while the accelerator pedal was not being depressed, and ii) it has been determined by the second determining device that the factor that changes the input torque of the automatic transmission has been generated.

According to this construction, because, when i) it has been determined by the first determining device that the control for the predetermined upshift has been started while the accelerator pedal was not being depressed, and ii) it has been determined by the second determining device that a factor that changes the input torque of the automatic transmission has been generated, the controller corrects the engaging pressure of the predetermined hydraulic frictional engagement device by a correction amount in accordance with that factor that changes the input torque, undershooting of the engine speed, as well as shift shock which results from that undershooting, is able to be preferably suppressed even when a factor that changes the output torque of the engine is generated.

A second aspect of the invention relates to a control method for a hydraulic frictional engagement device of a vehicular automatic transmission. The method includes the steps of: i) determining whether control for a predetermined upshift has been started while an accelerator pedal was not being depressed; ii) determining whether a factor that changes an input torque of the automatic transmission has been generated (S2 to S7); iii) correcting the engaging pressure of a predetermined hydraulic frictional engagement device by a correction amount in accordance with the factor that changes the input torque when i) it has been determined that the control for the predetermined upshift has been started while the accelerator pedal was not being depressed, and ii) it has been determined that the factor that changes the input torque of the automatic transmission has been generated; and iv) executing the predetermined upshift by increasing the engaging pressure of the predetermined hydraulic frictional engagement device to the corrected engaging pressure.

According to this construction, because, when i) it has been determined that the control for the predetermined upshift has been started while the accelerator pedal was not being depressed, and ii) it has been determined that a factor that changes the input torque of the automatic transmission has been generated, the engaging pressure of the predetermined hydraulic frictional engagement device is corrected by a correction amount in accordance with that factor that changes the input torque, undershooting of the engine speed, as well as shift shock which results from that undershooting, is able to be preferably suppressed even when a factor that changes the output torque of the engine is generated.

A third aspect of the invention relates to a hydraulic pressure control apparatus including a hydraulic pressure control circuit that controls an engaging pressure of a plurality of hydraulic frictional engagement device in a vehicular automatic transmission so as to shift a speed thereof; and a controller that increases the engaging pressure of a predetermined hydraulic frictional engagement device by switching a hydraulic circuit in the hydraulic pressure control circuit when a predetermined upshift is executed. The controller including: a first determining device that determines whether control for the predetermined upshift has been started while an accelerator pedal was not being depressed; a second determining device that determines whether a factor that changes an input torque of the automatic transmission has been generated, and a correction device that corrects the engaging pressure of the predetermined hydraulic frictional engagement device by a correction amount in accordance with the factor that changes the input torque when i) it has been determined by the first determining device that the control for the predetermined upshift has been started while the accelerator pedal was not being depressed, and ii) it has been determined by the second determining device that the factor that changes the input torque of the automatic transmission has been generated.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Hereinafter, exemplary embodiments will be described in detail with reference to the appended drawings.

Figure 1:
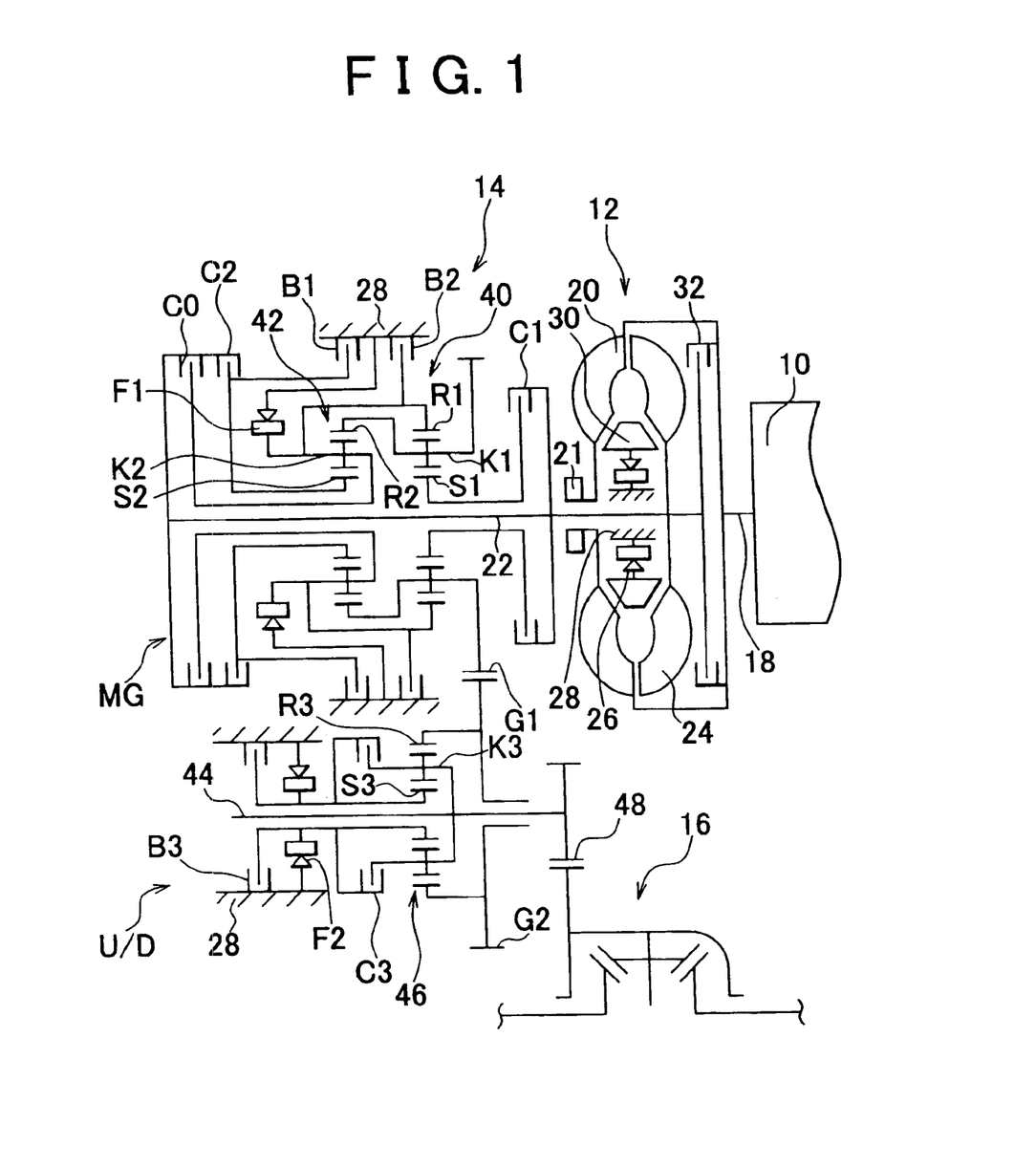
FIG. 1 is a skeleton view illustrating the construction of a vehicular driving apparatus to which a hydraulic pressure control apparatus for an automatic transmission according to one exemplary embodiment of the invention has been applied.

FIG. 1 is a skeleton view of a transverse mounted vehicular driving apparatus for a vehicle such as a FF (front engine, front drive) vehicle. Output from an engine 10, which is an internal combustion engine such as a gasoline engine, is transmitted to driven wheels (front wheels), not shown, via power transmitting apparatuses such as a torque converter 12, an automatic transmission 14, and a differential gear unit 16. The torque converter 12 includes a pump impeller 20 which is connected to a crankshaft 18 of the engine 10, a turbine impeller 24 which is connected to an input shaft 22 of the automatic transmission 14, a stator 30 which is fixed to a housing 28 that is a non-rotatable member via a one-way clutch 26, and a lockup clutch 32 that directly connects the crankshaft 18 with the input shaft 22 via a damper, not shown. A mechanical oil pump 21 such as a gear pump is connected to the pump impeller 20. This oil pump 21 is driven together with the pump impeller 20 by the engine 10 so as to generate hydraulic pressure used for shifting and lubrication. The engine 10 is a driving power source for running a vehicle. The torque converter 12 is a fluid coupling.

The automatic transmission 14 includes a single pinion type first planetary gearset 40 and second planetary gearset 42, a third planetary gearset 46, and an output gear 48. The first planetary gearset 40 and second planetary gearset 42 are both provided on the same axis as the input shaft 22, with a carrier of the first planetary gearset 40 coupled to a ring gear of the second planetary gearset 42 and a carrier of the second planetary gearset 42 coupled to a ring gear of the first planetary gearset 40, such that the first planetary gearset 40 and second planetary gearset 42 together form a CR—CR coupled planetary gearset. The third planetary gearset 46 is provided on the same axis as a countershaft 44 which is parallel with the input shaft 22. The output gear 48 is fixed to an end portion of the countershaft 44 and is engaged with the differential gear unit 16. The structural elements of the first planetary gearset 40, second planetary gearset 42, and third planetary gearset 46, i.e., a sun gear, a ring gear, and a carrier that rotatably supports planetary gears that engage with the sun gear and ring gear, can either be selectively coupled together by four clutches C0, C1, C2, and C3, or selectively coupled to the housing 28, which is a non-rotatable member, by three brakes B1, B2, and B3. Further, a carrier K2 and a sun gear S3 can both rotate with respect to the housing 28 in a direction allowable by separate one-way clutches F1 and F2, respectively, or can both be engaged with the housing 28 in an opposite direction against the direction allowable by separate one-way clutches F1 and F2, respectively. Because the differential gear unit 16 is symmetrical with respect to the axis or center line (the vehicle axis), the bottom half thereof will be omitted.

The first planetary gearset 40 and second planetary gearset 42 on the same axis as the input shaft 22, together with the clutches C0, C1, C2, the brakes B1 and B2, and the one-way clutch F1 make up a main transmitting portion MG capable of four forward speeds and one reverse speed. The third planetary gearset 46 on the same axis as the countershaft 44, together with the clutch C3, the brake B3, and the one-way clutch F2 make up an auxiliary transmitting portion, i.e., an underdrive portion U/D. In the main transmitting portion MG, the input shaft 22 is coupled to the carrier K2 of the second planetary gearset 42 via the clutch C0, a sun gear S1 of the first planetary gearset 40 via the clutch C1, and a sun gear S2 of the second planetary gearset 42 via the clutch C2. A ring gear R1 of the first planetary gearset 40 is connected to the carrier K2 of the second planetary gearset 42, and a ring gear R2 of the second planetary gearset 42 is connected to a carrier K1 of the first planetary gearset 40. The sun gear S2 of the second planetary gearset 42 is coupled to the housing 28 via the brake B1. The ring gear R1 of the first planetary gearset 40 is coupled to the housing 28 via the brake B2. The one-way clutch F1 is provided between the carrier K2 of the second planetary gearset 42 and the housing 28. A first counter gear G1, which is fixed to the carrier K1 of the first planetary gearset 40, is meshed with a second counter gear G2, which is fixed to a ring gear R3 of the third planetary gearset 46. In the underdrive portion U/D, a carrier K3 and the sun gear S3 of the third planetary gearset 46 are coupled together via the clutch C3. Also in the underdrive portion U/D, the brake B3 and the one-way clutch F2 are provided in parallel between the sun gear S3 and the housing 28.

Figure 2:
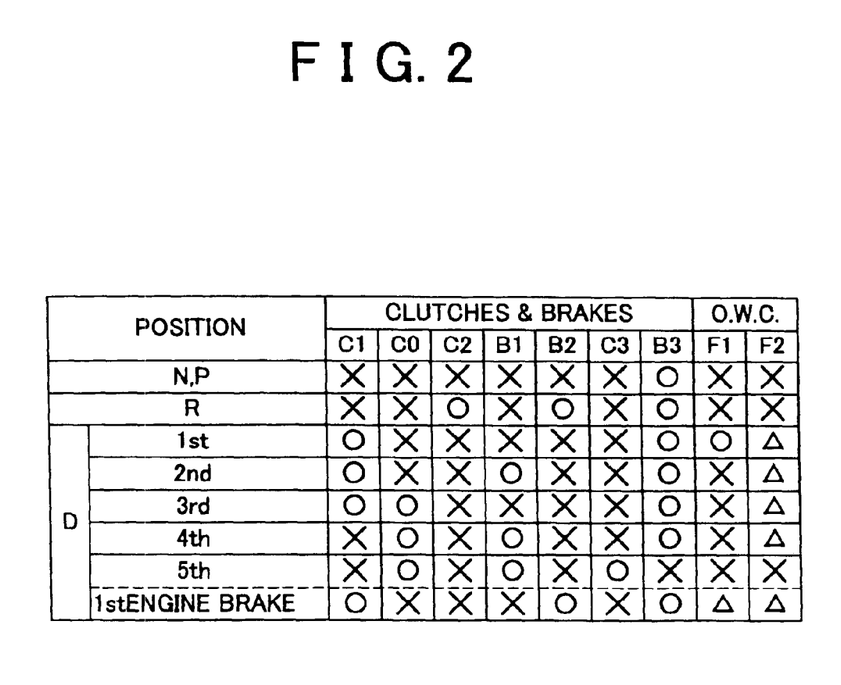
FIG. 2 is a clutch application chart showing various engagement and release combinations of clutches and brakes to achieve specific speeds in the automatic transmission shown in FIG. 1.

The clutches C0, C1, C2, and C3 and the brakes B1, B2, B3 (hereinafter simply referred to as "clutches C" and brakes B", respectively, when not specified further) are hydraulic frictional engagement devices such as multi-disc clutches or band brakes which are applied by hydraulic actuators. These clutches C and brakes B are switched between an applied state and a released state as shown in FIG. 2, for example, by switching solenoids S1 to S5 and linear solenoid valves SL1, SL2, and SLU of a hydraulic pressure control circuit 98 (see FIG. 3) between an energized state and a de-energized state, or by switching a hydraulic circuit using a manual valve, not shown. Each speed, i.e., five forward speeds, one reverse speed, and neutral speed, is achieved according to a position of a shift lever 72 (see FIG. 8). The denotations "1st" to "5th" in FIG. 2 denote the first forward speed to the fifth forward speed, respectively. The single circle indicates application of the clutches C and the brakes B. The "X" indicates release of the clutches C and the brakes B. The triangle indicates application of the clutches C and the brakes B only during driving. The shift lever 72 is operated in a shift pattern which includes a park position "P", a reverse drive position "R", a neutral position "N", and forward drive positions "D", "4", "3", "2", and "L", as shown in FIG. 4, for example. When the shift lever 72 is in the "P" or the "N" position, the transmission is in a neutral speed, i.e., a non-driving speed, in which the transmission of power is interrupted. When the shift lever 72 is in the "P" position, the driven wheels are mechanically prevented from rotating by a mechanical parking mechanism, not shown. Also, the five forward speeds and the one reverse speed achieved when the shift lever 72 is in any one of the forward drive positions, such as the "D" position, or the "R" position, respectively, correspond to driving speeds. Further, as shown in FIG. 2, a shift between second speed and third speed is a clutch-to-clutch or synchronous shift, in which the clutch C0 is applied at the same time the brake B1 is released, or vice versa. Similarly, a shift between third speed and fourth speed is a clutch-to-clutch shift in which the clutch C1 is applied at the same time the brake B1 is released, or vice versa. Engaging pressure $P_{C0}$ of the clutch C0 is directly controlled by output pressure which is controlled by the linear solenoid valve SL2. In the above-mentioned hydraulic frictional engagement device, a line pressure regulated by a turbine torque $T_T$, i.e., an input torque $T_{IN}$ of the automatic transmission 14, or a throttle opening amount $\theta_{TH}$ which is a value representative thereof, is used as the base pressure for the hydraulic frictional engagement device.

Figure 3:
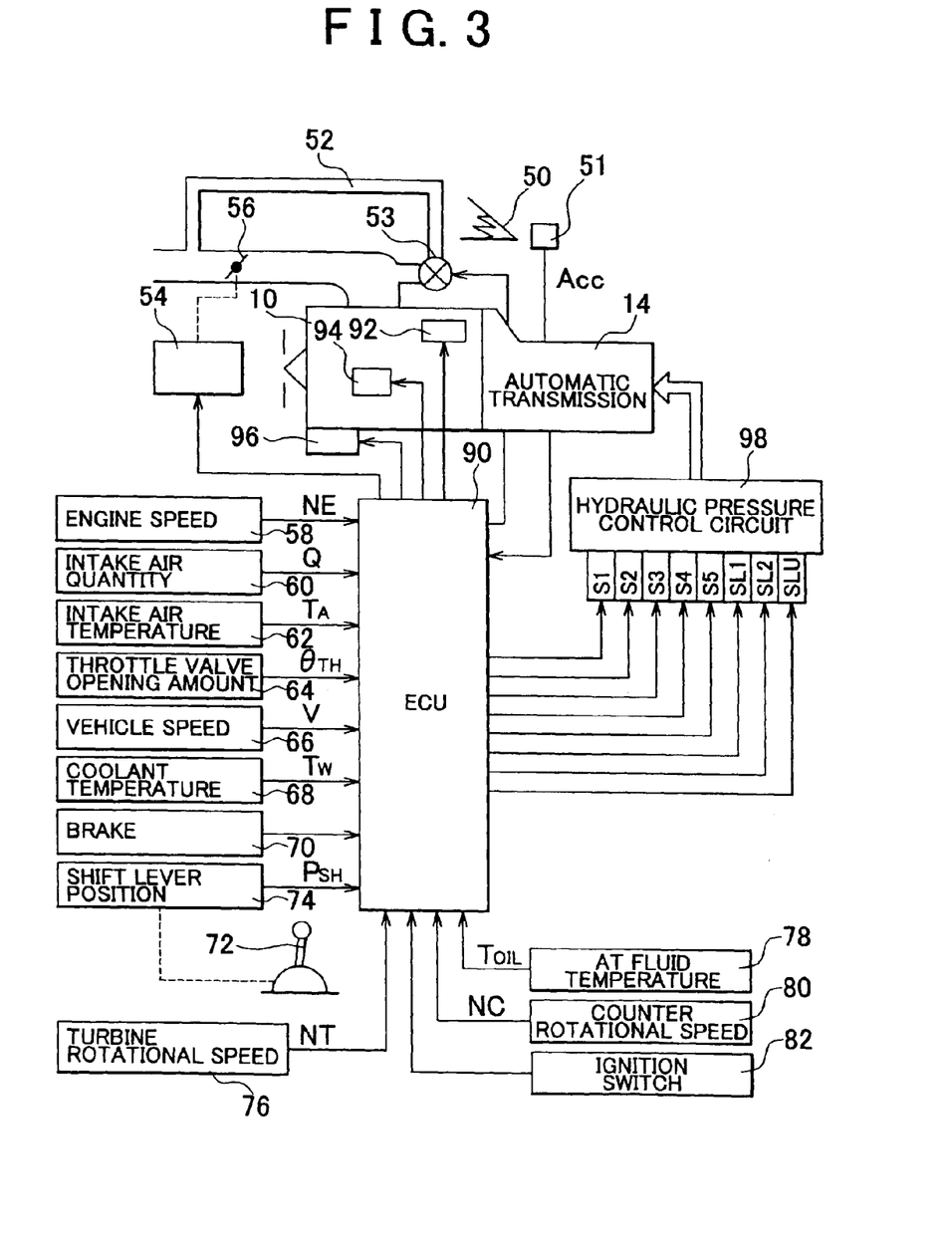
FIG. 3 is a block diagram of a control system that performs engine control and shift control in the vehicular driving apparatus shown in FIG. 1.
Figure 4:
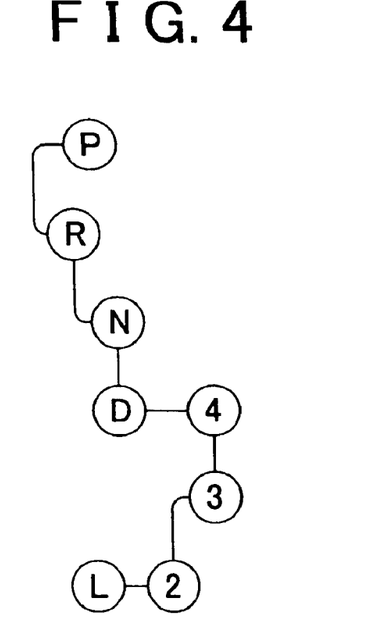
FIG. 4 is a view showing one example of a shift pattern of a shift lever shown in FIG. 3.
Figure 5:
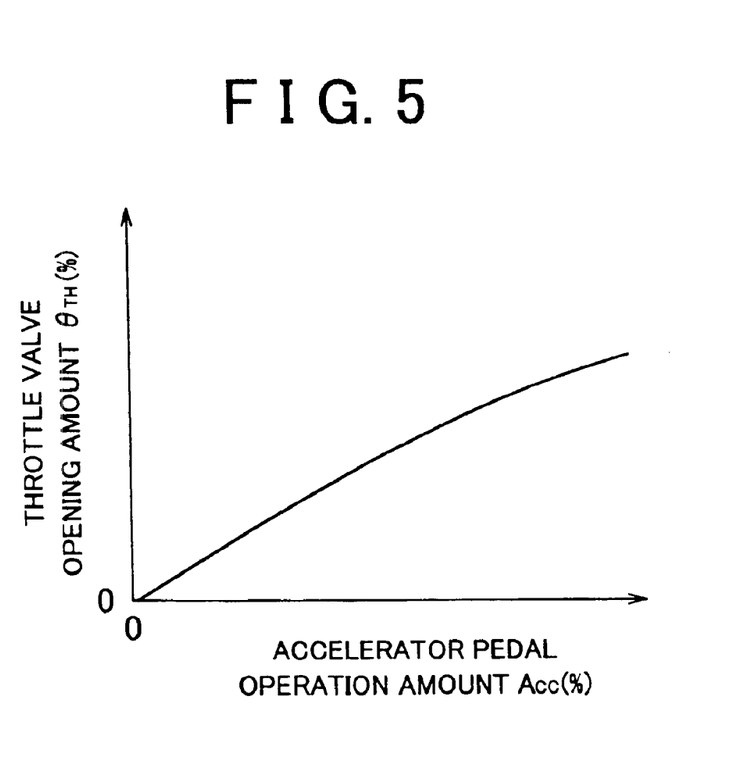
FIG. 5 is a graph showing one example of the relationship between an accelerator pedal operation amount $A_{CC}$ and a throttle valve opening amount $\theta_{TH}$ used in throttle control performed by an ECU shown in FIG. 3.

FIG. 3 is a block diagram illustrating a control system provided in a vehicle for controlling the engine 10 and automatic transmission 14 and the like shown in FIG. 1. According to this control system, the operation amount (accelerator opening amount) $A_{CC}$ of an accelerator pedal 50 is detected by an accelerator operation amount sensor 51. This accelerator pedal 50 corresponds to an accelerator operating member and can be depressed to a large degree depending on the amount of output required by a driver. Further, the accelerator pedal operation amount $A_{CC}$ corresponds to the amount of required output. An electronic throttle valve 56 is provided in an intake pipe of the engine 10. A throttle actuator 54 changes the opening amount of this electronic throttle valve 56 so that it becomes an opening amount $\theta_{TH}$ (%) determined based on the accelerator pedal operation amount $A_{CC}$ from a pre-stored (i.e., preset) relationship shown in FIG. 5. This relationship is set such that the throttle opening amount $\theta_{TH}$ increases as the accelerator pedal operation amount $A_{CC}$ becomes larger. Also, in a bypass passage 52 which bypasses the electronic throttle valve 56 is provided an ISC (idle speed control) valve 53 that controls the intake air quantity when the electronic throttle valve 56 is fully closed in order to control an idle speed $NE_{IDL}$ of the engine 10. In addition, other sensors and switches are also provided, such as an engine speed sensor 58 for detecting an engine speed NE of the engine 10, an intake air quantity sensor 60 for detecting an intake air quantity Q of the engine 10, an intake air temperature sensor 62 for detecting a temperature $T_A$ of the intake air, a throttle sensor 64 with an idle switch for detecting whether the electronic throttle valve 56 is fully closed (i.e., whether the engine 10 is in an idle state) and an opening amount $\theta_{TH}$ of that electronic throttle valve 56, a vehicle speed sensor 66 for detecting a rotational speed $N_{OUT}$ of the countershaft 44 which corresponds to the vehicle speed V, a coolant temperature sensor 68 for detecting an engine coolant temperature $T_W$ of the engine 10, and a brake switch 70 for detecting whether a foot brake is being operated. In addition, other sensors and switches include a lever position sensor 74 for detecting a lever position (i.e., operating position) $P_{SH}$ of the shift lever 72, a turbine rotational speed sensor 76 for detecting a turbine rotational speed $N_T$ (=rotational speed $N_{IN}$ of the input shaft 22), an AT fluid sensor 78 for detecting an AT fluid temperature $T_{OIL}$, which is the temperature of the hydraulic fluid within the hydraulic pressure control circuit 98, a counter rotational speed sensor 80 for detecting a rotational speed NC of the first counter gear G1, and an ignition switch 82. Signals from these sensors indicative of the engine speed NE, intake air quantity Q, intake air temperature $T_A$, throttle valve opening amount $\theta_{TH}$, vehicle speed V, engine coolant temperature $T_W$, a brake operation, lever position $P_{SH}$ of the shift lever 72, turbine rotation speed $N_T$, AT fluid temperature $T_{OIL}$, counter rotational speed NC, and the operational position of the ignition switch 82, and the like are supplied to an electronic control unit (ECU) 90. The brake switch 70 is an ON-OFF switch that switches the brake on and off depending on whether the brake pedal, which operates a main brake, is depressed or not.

The ECU 90 includes a microcomputer that has a CPU, RAM, ROM, an input/output interface and the like. The CPU controls the output of the engine 10 and the shifting of the automatic transmission 14 and the like using the temporary storage function of the RAM and processing signals according to a program stored in the ROM beforehand. When necessary, the CPU may be configured such that a portion thereof for engine control is separate from a portion thereof for shift control. Controlling the output of the engine 10 includes controlling the electronic throttle valve 56 open and closed with the throttle actuator 54, controlling a fuel injection valve 92 in order to control the fuel injection quantity, controlling an ignition device 94, such as an igniter, in order to control the ignition timing, and controlling the ISC valve 53 in order to control the idle speed. The electronic throttle valve 56 is controlled by driving the throttle actuator 54 based on the actual accelerator pedal operation amount $A_{CC}$ according to the relationship between the accelerator pedal operation amount $A_{CC}$ and the throttle valve opening amount $\theta_{TH}$, shown in FIG. 5, for example, and increasing the throttle valve opening amount $\theta_{TH}$ as the accelerator pedal operation amount $A_{CC}$ increases. When the engine 10 is started, the crankshaft 18 is cranked by a starter (electric motor) 96.

Figure 6:
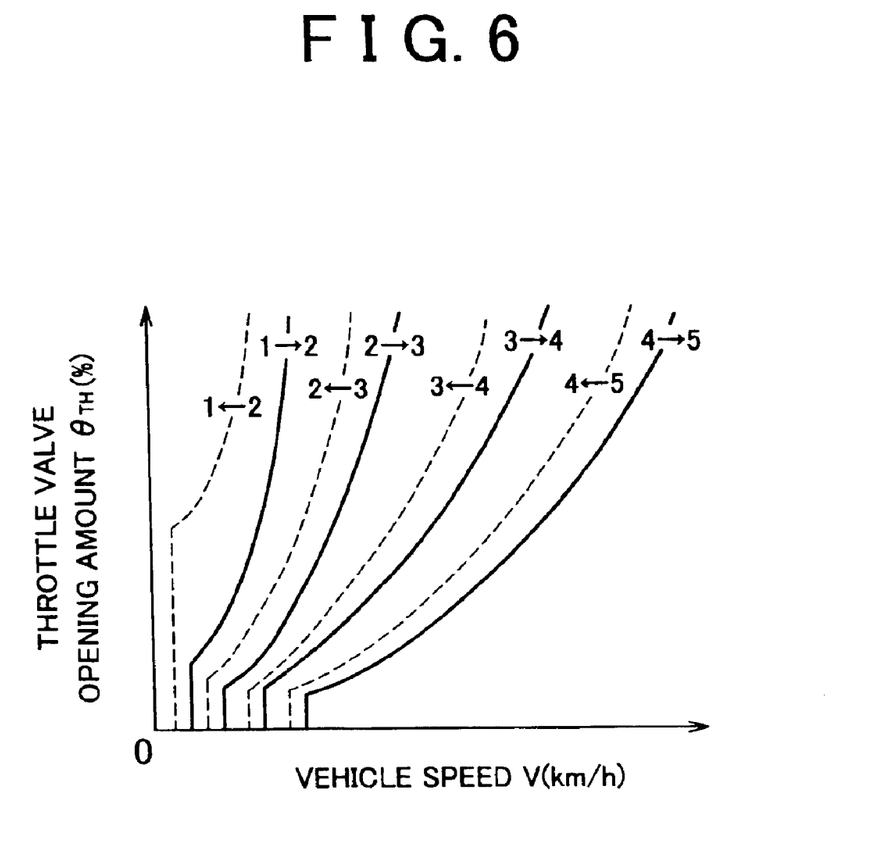
FIG. 6 is a view showing a shift line graph (i.e., shift map) used in shift control of the automatic transmission performed by the ECU shown in FIG. 3.
Figure 7:
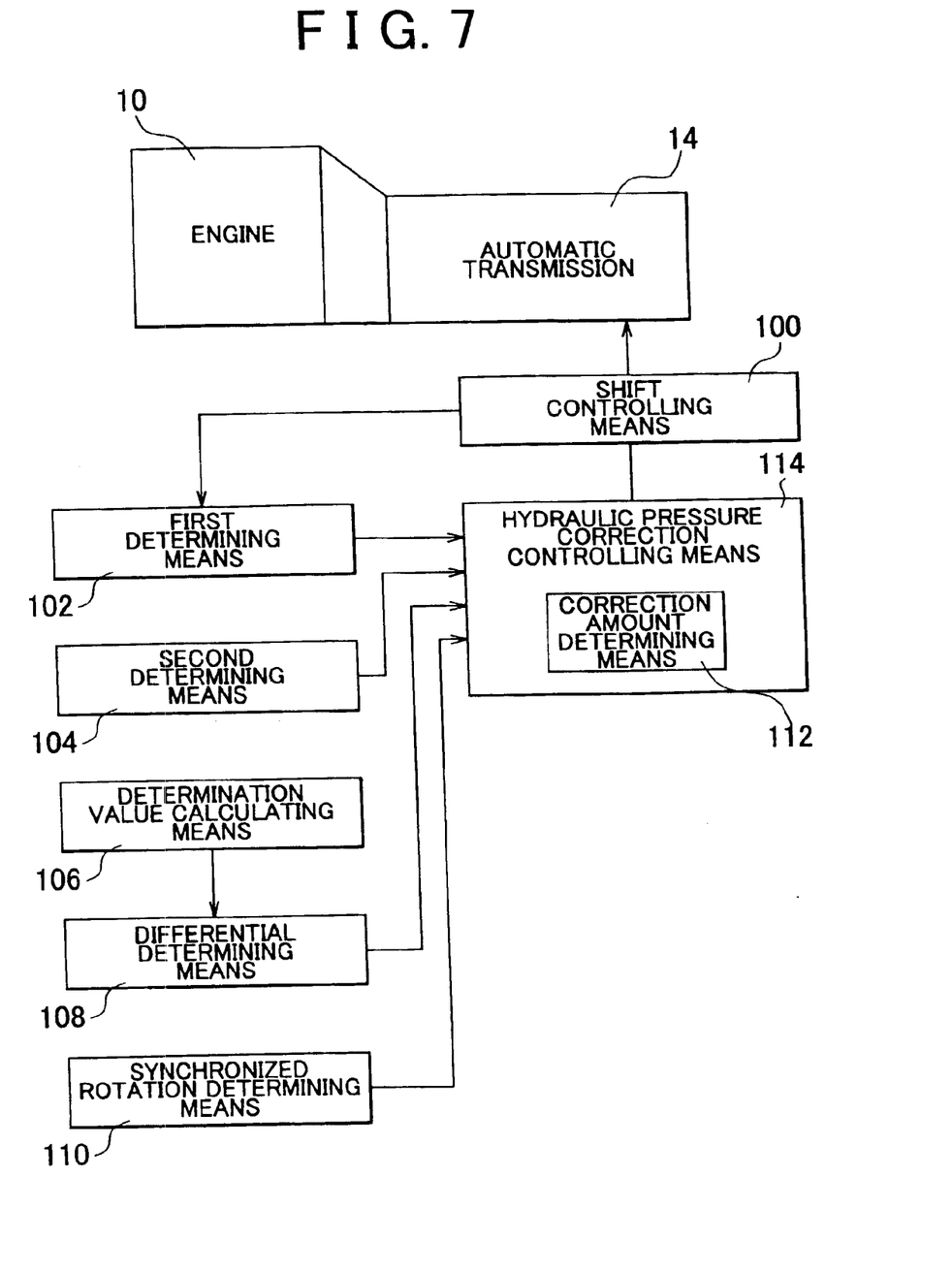
FIG. 7 is a functional block line diagram illustrating main portions of a control function of the ECU shown in FIG. 3, i.e., a correction control function of an engaging pressure of a hydraulic frictional engagement device to be engaged during a power-off upshift.

FIG. 7 is a functional block line diagram illustrating main portions of a control function of the ECU 90 shown in FIG. 3, i.e., a correction control function of an engaging pressure of a hydraulic frictional engagement device to be engaged during a power-off upshift. In the drawing, shift controlling means 100 determines the speed that the automatic transmission 14 should shift into from the current speed based on the actual throttle valve opening amount $\theta_{TH}$ and the vehicle speed V according to a pre-stored shift line graph (i.e., shift map) shown in FIG. 6, for example. Next, the shift controlling means 100 outputs a shift command which starts a shift operation to shift the automatic transmission 14 from the current speed to the determined speed. In addition, the shift controlling means 100 switches solenoids S1 to S5 of the hydraulic pressure control circuit 98 on (energized) and off (de-energized) and continually changes the energized state of the linear solenoid valves SL1, SL2, and SLU of the hydraulic pressure control circuit 98 by duty control or the like, so that shift shock due to a change in driving force will not occur and the durability of the friction members will not decrease. In FIG. 6, the solid lines are upshift lines and the broken lines are downshift lines. The automatic transmission 14 shifts to a speed on the low speed side having a large gear ratio (=input rotational speed $N_{IN}$/output rotational speed $N_{OUT}$) as the vehicle speed V decreases or the throttle valve opening amount $\theta_{TH}$ increases. The denotations "1" through "5" in the drawing refer to the first speed "1st" through the fifth speed "5th". For example, during a 1→2 upshift, the engaging pressure $P_{B1}$ of the brake B1, which is a hydraulic frictional engagement device to be applied, is increased so as to engage the brake B1. During a 2→3 upshift, the engaging pressure $P_{C0}$ of the clutch C0, which is a hydraulic frictional engagement device to be applied, is increased so as to engage the clutch C0. During a 3→4 upshift, the engaging pressure $P_{B1}$ of the brake B1, which is a hydraulic frictional engagement device to be applied, is increased so as to engage the brake B1. During a 4→5 upshift, the engaging pressure $P_{C3}$ of the clutch C3, which is a hydraulic frictional engagement device to be applied, is increased so as to engage the clutch C3. The engaging pressures $P_{B1}$, $P_{C0}$, and $PC_3$ at that time are directly controlled by the supply of the output pressure from the linear solenoid valve SL1 or SL2, and are increased in a preset pattern according to input torque (an estimated value) of the automatic transmission 14. Also, when a factor is generated that changes the output torque of the engine 10, i.e., when a factor is generated that changes the input torque of the automatic transmission 14, the engaging pressure of the predetermined hydraulic frictional engagement device that is to be engaged for the upshift is corrected by a correction amount that corresponds to that factor. As a result, undershooting of the engine speed NE, as well as shift shock that occurs due to that undershooting, is preferably suppressed regardless of the generation of a factor that changes in the output torque of the engine 10. A factor that changes the input torque of the automatic transmission 14 may be fuel cut control that cuts the fuel supply to the engine 10, air conditioner control that uses a compressor driven by the engine 10, or lockup clutch control that fully or partially engages the lockup clutch 32 provided in a torque converter (fluid power transmitting device) 12 disposed between the engine 10 and the automatic transmission 14, or the like.

First determining means 102 determines whether control for a predetermined upshift has been started while the accelerator pedal 50 was not being depressed when the vehicle is running, based on whether a command for an upshift has been output from the shift controlling means 100 and whether the accelerator opening amount $\theta_{TH}$ is zero (%).

Second determining means 104 determines whether a factor that changes an output torque $T_E$ of the engine 10, i.e., whether a factor that changes an input torque $T_{IN}$ of the automatic transmission 14, has been generated based on whether any one of fuel-cut control that cuts the supply of fuel to the engine 10, air conditioner control that uses a compressor driven by the engine 10, lockup clutch slip control that partially engages the lockup clutch 32 provided in the torque converter 12 disposed between the engine 10 and the automatic transmission 14, or the like has been started.

Figure 8:
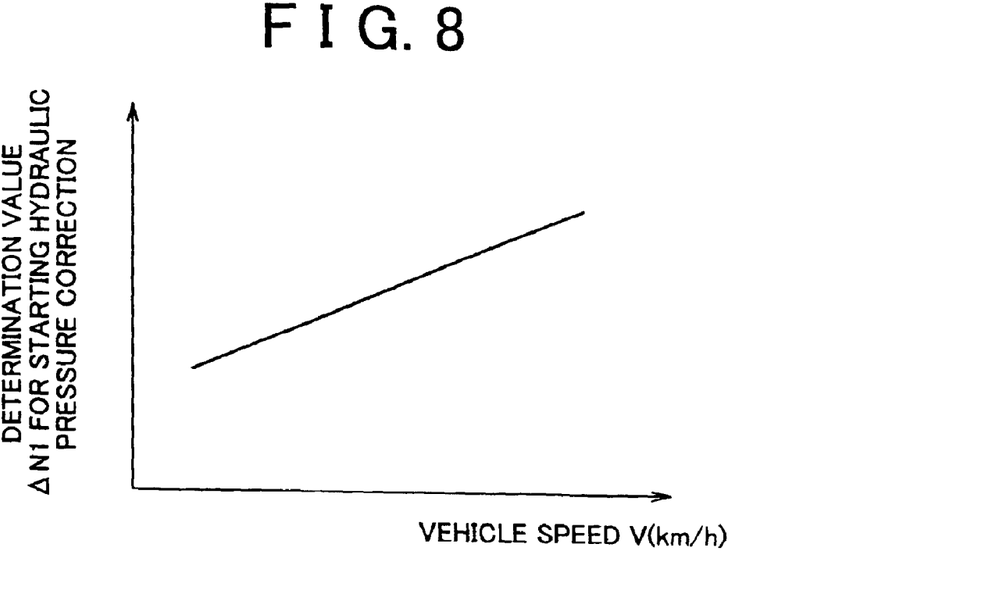
FIG. 8 is a graph showing a pre-stored relationship used to determine a determination value for starting hydraulic correction in determination value calculating means shown in FIG. 7.

Determination value calculating means 106 calculates a determination value $\Delta N1$ based on the actual vehicle speed V (km/h) from the relationship shown in FIG. 8, for example, which is stored in advance. The relationship shown in FIG. 8, is obtained by testing beforehand in order to start the correction of the engaging pressure of the hydraulic frictional engaging device to be engaged during the power-off upshift period at appropriate timing, and is set such that the determination value ΔN1 becomes larger as the vehicle speed V increases.

Differential determining value means 108 calculates a differential value ΔN which is the difference between the input shaft rotational speed $N_{IN}$ of the automatic transmission 14, i.e., the turbine rotational speed $N_T$, and the synchronized rotational speed, i.e., the rotational speed derived by multiplying a gear ratio γ after the upshift by the actual output shaft rotational speed $N_{OUT}$ of the automatic transmission 14, and determines whether that differential value ΔN is equal to, or greater than, the determination value ΔN1 calculated (i.e., set) beforehand by the determination value calculating means 106. (The synchronized rotational speed is a rotational speed of the input shaft when the upshift control is complete.) Synchronized rotation determining means 110 determines whether or not the rotation is synchronized, i.e., whether the upshift is complete, based on whether the input shaft rotational speed $N_{IN}$ of the automatic transmission 14, i.e., the turbine rotational speed $N_T$, and the synchronized rotational speed, i.e., the rotational speed derived by multiplying a gear ratio γ after the upshift by the actual output shaft rotational speed $N_{OUT}$ of the automatic transmission 14, match.

Figure 9:
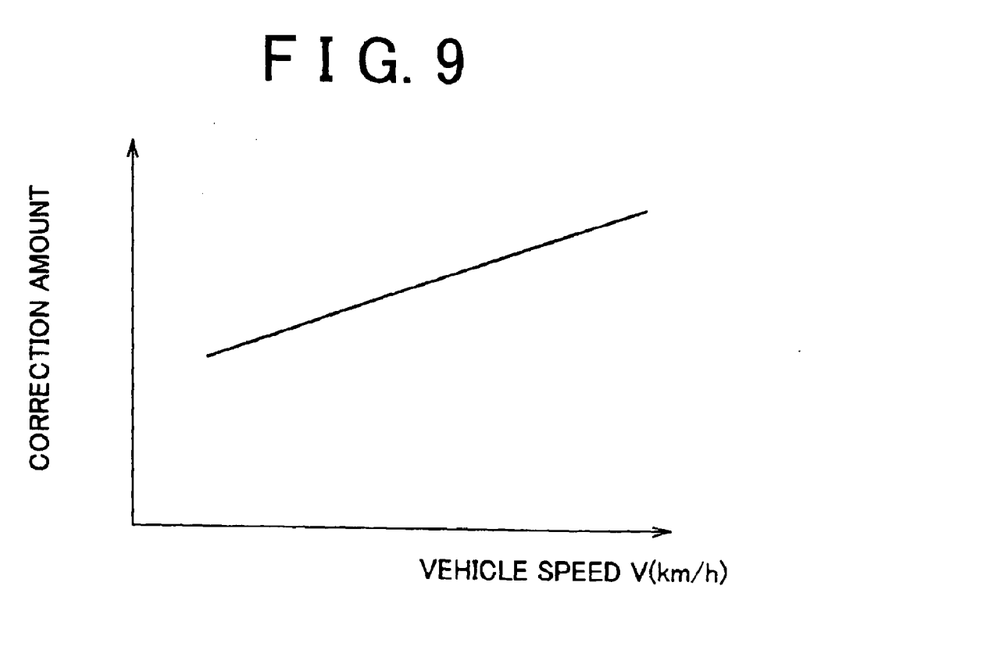
FIG. 9 is a graph showing a pre-stored relationship used to determine a correction amount for correcting the engaging pressure in the hydraulic frictional engagement device to be engaged for a power-off upshift in correction amount determining means shown in FIG. 7.

Correction amount determining means 112 determines a hydraulic pressure correction amount based on the actual vehicle speed V (km/h) from the pre-stored relationship shown in FIG. 9, for example. Preferably, the relationship is set differently for each factor that changes the input torque $T_{IN}$ of the automatic transmission 14, such as the fuel-cut control, air conditioner control, lockup clutch control and the like. Hydraulic pressure correction amounts $\Delta P_F$, $\Delta P_A$, and $\Delta P_{LC}$ are each determined based on the vehicle speed V (km/h) from the relationship selected according to the factor.

When the first determining means 102 determines that a predetermined upshift control has been started when the accelerator pedal 50 was not being depressed and the second determining means 104 determines that a factor has been generated that changes the input torque $T_{IN}$ of the automatic transmission 14, correction controlling means 114 corrects the engaging pressure of the hydraulic frictional engagement device to be engaged for the power-off upshift, e.g., corrects the engaging pressure $P_{B1}$ of the brake B1 for a 1→2 upshift, in real time by the correction amount ΔP that was determined by the correction amount determining means 112 according to the factor that changes the input torque. The correction controlling means 114 performs that correction from the time the differential value determining means 108 has determined that the differential value ΔN between the input shaft rotational speed $N_{IN}$ of the automatic transmission 14, i.e., the turbine rotational speed $N_T$, and the synchronized rotational speed, i.e., the rotational speed derived by multiplying a gear ratio γ after the upshift by the actual output shaft rotational speed $N_{OUT}$ of the automatic transmission 14, is equal to, or less than, the preset determination value ΔN1, until the synchronized rotation determining means 110 determines that the input shaft rotational speed $N_{IN}$ of the automatic transmission 14 has reached the synchronized rotational speed.

For example, the correction controlling means 114 adds up the hydraulic pressure correction amounts $\Delta P_F$, $\Delta P_A$, and $\Delta P_{LC}$ calculated by the correction amount determining means 112 for each factor that changes the input torque $T_{IN}$ of the automatic transmission 14, such as the fuel-cut control, air conditioner control, lockup clutch control and the like. Further, the correction controlling means 114 performs the correction using a sum correction value $\Delta P_S$ determined based on a sum value ($= \Delta P_F + \Delta P_A + \Delta P_{LC}$) by adding that sum correction value $\Delta P_S$ to the engaging pressure $P_{B1}$ of the brake B1 for a 1→2 upshift. The correction is performed by determining the total command value (command value) necessary to output the sum value according to a conversion map which takes a non linear characteristic between a command signal to the linear solenoid valve SL1 shown in FIG. 10, for example, and an output pressure into consideration, and adding that total command value to a base command value for outputting the engaging pressure $P_{B1}$ of the brake B1. Even after the factor for changing the input torque of the automatic transmission 14 has stopped being generated after the correction controlling means 114 has corrected the engaging pressure of a predetermined hydraulic frictional engagement device for an upshift once, the correction controlling means 114 still continues to correct the engaging pressure in real time, giving priority to the stability of the engaging pressure control.

Figure 10:
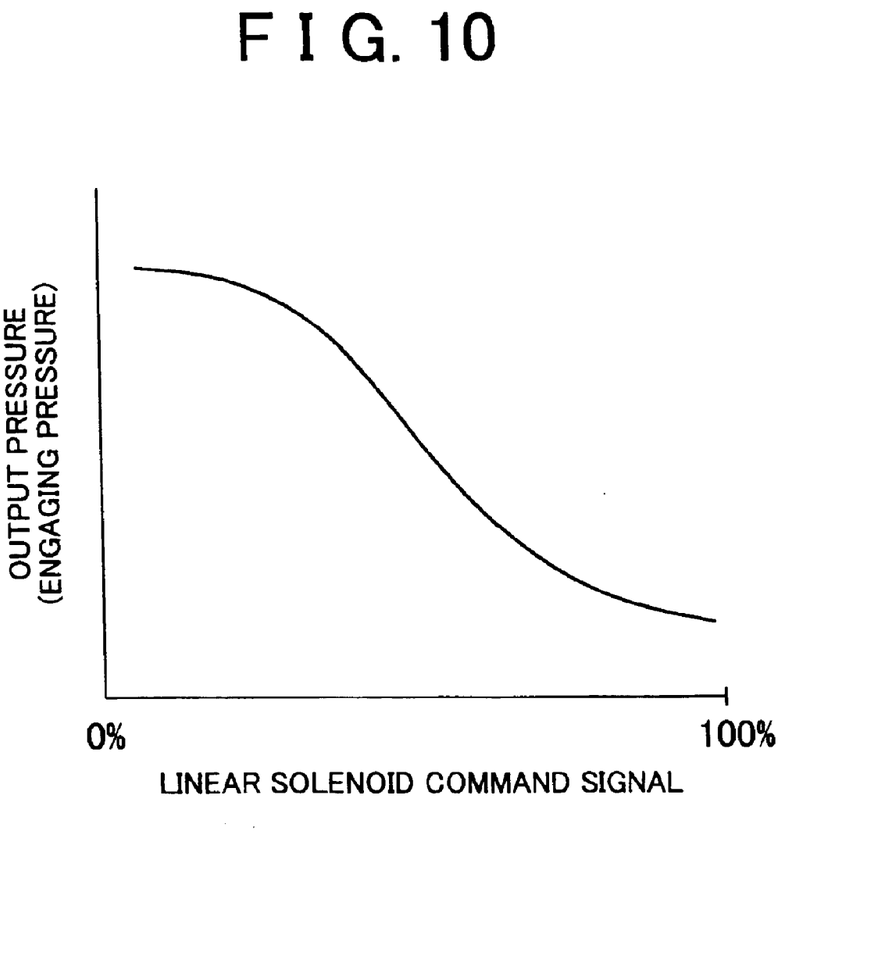
FIG. 10 is a graph showing a characteristic of a linear solenoid used to control the engaging pressure of the hydraulic frictional engagement device to be engaged for a power-off upshift, or for correcting that control, in correction controlling means shown in FIG. 7.
Figure 11:
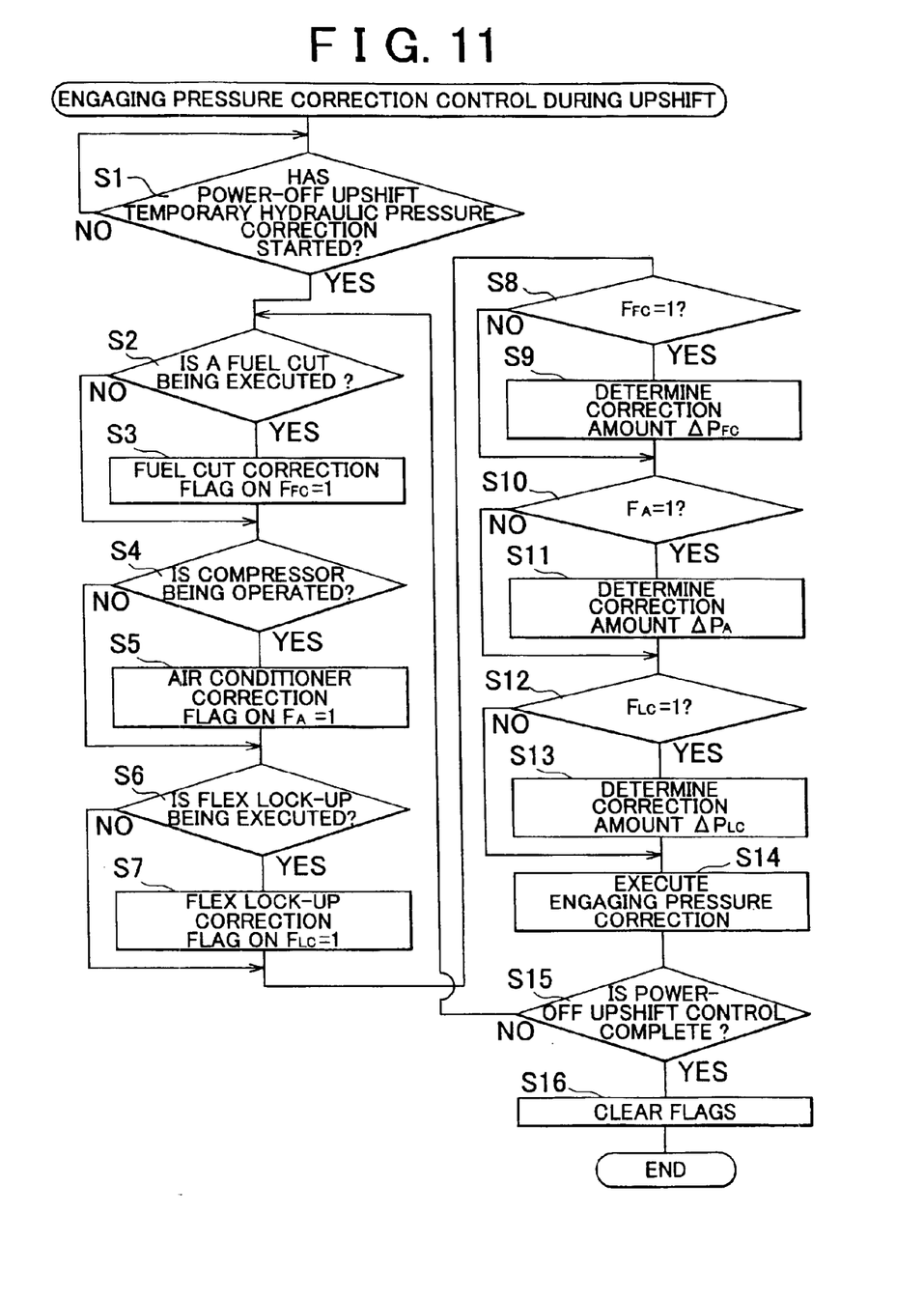
FIG. 11 is a flowchart illustrating the main portions of a control operation of the ECU shown in FIG. 3, i.e., a correction control operation of the engaging pressure of the hydraulic frictional engagement device to be engaged within the power-off upshift period.
Figure 12:
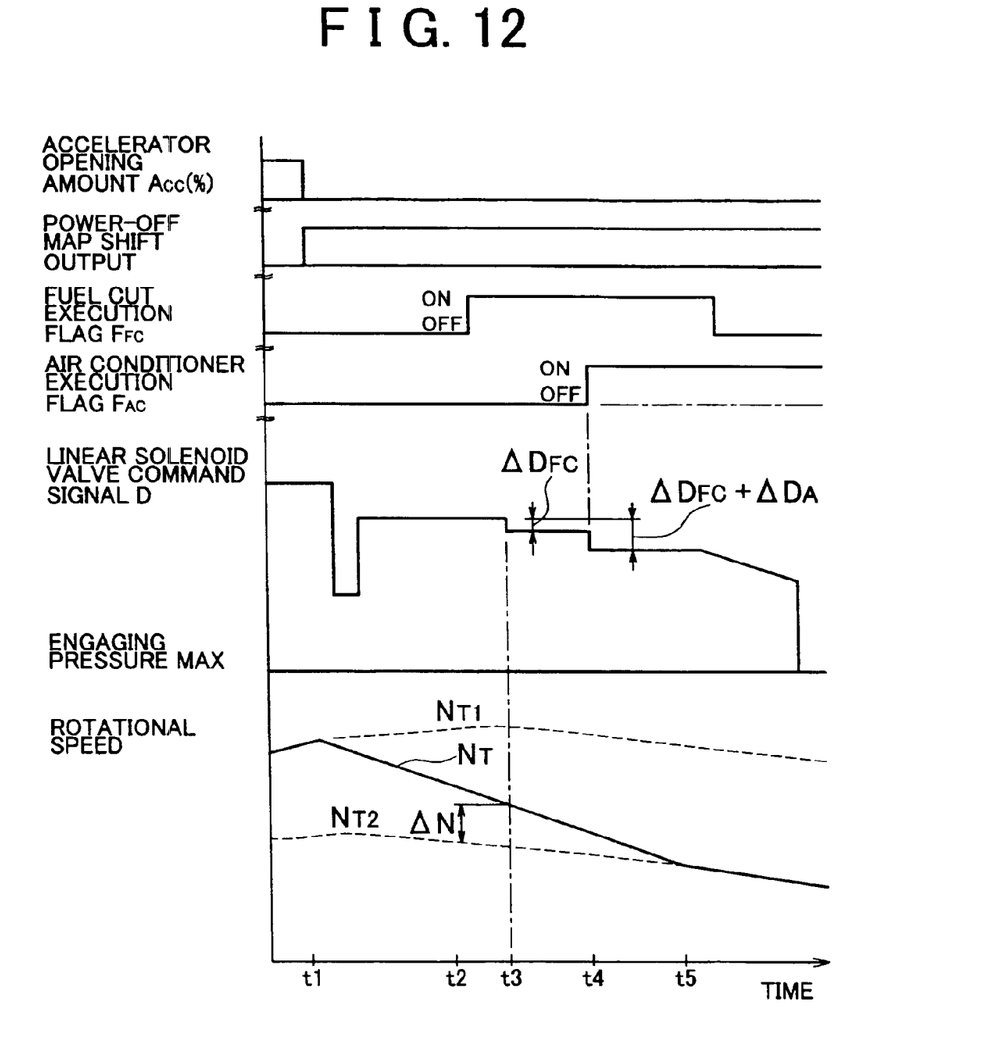
FIG. 12 is a time chart showing the main potions of the control operation of the ECU shown in FIG. 3, i.e., a correction control operation of the engaging pressure of the hydraulic frictional engagement device to be engaged within the power-off upshift period.

FIG. 11 is a flowchart illustrating the main portions of a control operation of the ECU 90, i.e., a correction control operation of the engaging pressure of the hydraulic frictional engagement device to be engaged during a power-off upshift. The routine shown in this flowchart is repeated at predetermined intervals of ten plus milliseconds to several tens of milliseconds. The control flow shown in FIG. 11 is performed under the condition that either a) it has been determined that a power-off upshift (i.e., a shift) should be performed, or b) it has been determined that a command for a power-off upshift has been output, in a step, which is not shown, that corresponds to the first determining means 102. For example, time $t_1$, in the time chart shown in FIG. 12 is the point at which the routine shown in the flowchart starts. When a signal for an upshift is output, a command signal to a solenoid valve for controlling an engaging pressure of a hydraulic frictional engagement device to be engaged in order to achieve that upshift is controlled. For example, a command signal D to the solenoid valve SL1 is controlled as shown in FIG. 12 to gradually increase the engaging pressure $P_{B1}$ of the brake B1 in a 1→2 upshift. That is, the command signal D is first temporarily decreased suddenly at time $t_1$ to increase the response of the brake B1, and is then gradually decreased from time $t_3$. The linear solenoid valve SL1 has a characteristic in which the output pressure decreases as the command signal thereto increases, as shown in FIG. 10, for example. When control for the engaging pressure $P_{B1}$ of the brake B1 starts, the turbine rotational speed $N_T$ changes from a value $N_{T1}$ which corresponds to a gear ratio $\gamma_1$ before the shift, toward a value $N_{T2}$ which corresponds to a gear ratio $\gamma_2$ after the shift.

Referring back to FIG. 11, in step S1 which corresponds to the determination value calculating means 106 and the differential value determining means 108, the determination value ΔN1 is calculated based on the actual vehicle speed V (km/h) from the pre-stored relationship shown in FIG. 8, for example, and the differential value ΔN between the input shaft rotational speed $N_{IN}$ of the automatic transmission 14, i.e., the turbine rotational speed $N_T$, and the synchronized rotational speed, i.e., the rotational speed derived by multiplying the gear ratio $\gamma_2$ after the upshift by the actual output shaft rotational speed $N_{OUT}$ of the automatic transmission 14, is successively calculated. In addition in step S1, it is determined whether the hydraulic pressure correction of the engaging pressure $P_{B1}$ has started during the power-off upshift based on whether that differential value ΔN is equal to, or less than, the determination value ΔN1. When the determination is NO, step S1 is repeated. When the determination in step S1 is YES, steps S2 and thereafter are performed to correct the engaging pressure $P_{B1}$ of the brake B1 for achieving, for example, 1→2 upshift, if that is the upshift to be performed. Time $t_3$ in FIG. 12 indicates that state. With respect to steps S2 and thereafter, steps S2 to S7 correspond to the second determining means 104, steps S8 to S13 correspond to the correction amount determining means 112, steps S14 to S16 correspond to the correction controlling means 114, and step S15 corresponds to the synchronized rotation determining means 110.

In step S2, it is determined whether a fuel-cut control that cuts the fuel supply to the engine 10 is being executed. If the determination in step S2 is YES, a fuel-cut correction flag $F_{FC}$ is set to "1" in step S3. If the determination in step S2 is NO, the routine proceeds directly on to step S4. In step S4, it is determined whether air conditioner control, in which a refrigerant compressor is driven by the engine 10, is being executed. If the determination in step S4 is YES, an air conditioner correction flag $F_A$ is set to "1" in step S5. If the determination in step S4 is NO, the routine proceeds directly on to step S6. In step S6, it is determined whether flex lockup control, i.e., lockup slip control, in which the lockup clutch 32 provided in parallel with the torque converter 12 is applied to a degree in which the crankshaft 18 of the engine 10 and the input shaft 22 of the automatic transmission 14 slip. If the determination in step S6 is YES, a flex lockup correction flag $F_{LC}$ is set to "1" in step S7. If the determination in step S6 is NO, the routine proceeds directly on to steps S8 and thereafter.

In step S8 it is determined whether the fuel-cut correction flag $F_{FC}$ is "1". If the determination in this step is YES, then a correction amount $\Delta P_{FC}$ for the engaging pressure $P_{B1}$ is calculated based on the vehicle speed V from the pre-stored relationship shown in FIG. 9, for example, in step S9. If the determination in step S8 is NO, however, the routine proceeds directly on to step S10. In step S10 it is determined whether the air conditioner correction flag $F_A$ is "1". If the determination in step S10 is YES, a correction amount $\Delta P_A$ for the engaging pressure $P_{B1}$ is calculated based on the vehicle speed V from the pre-stored relationship shown in FIG. 9, for example, in step S11. If the determination in step S10 is NO, however, the routine proceeds directly on to step S12. In step S12 it is determined whether the flex lockup correction flag $F_{LC}$ is "1". If the determination in step S12 is YES, a correction amount $\Delta P_{LC}$ for the engaging pressure $P_{B1}$ is calculated based on the vehicle speed V from the pre-stored relationship shown in FIG. 9, for example, in step S13. If the determination in step S12 is NO, however, the routine proceeds directly on to step S14, which corresponds to correction controlling means 114.

In step S14, the hydraulic pressure correction amount $\Delta P_{FC}$ during fuel-cut control that was calculated in step S9, the hydraulic pressure correction amount $\Delta P_A$ during air conditioner control that was calculated in step S11, and the hydraulic pressure correction amount $\Delta P_{LC}$ during the flex lockup clutch control that was calculated in step S13, are all added up. In addition in step S14, the sum correction value $\Delta P_S$ is determined based on the sum value ($=\Delta P_F+\Delta P_A+\Delta P_{LC}$). Also in step S14, the linear solenoid value SL1 is driven using that sum correction value $\Delta P_S$ such that the sum correction value $\Delta P_S$ is added to the engaging pressure $P_{B1}$ of the brake B1 in a 1→2 upshift, for example. The total command value (command value) necessary to add the sum value to the engaging pressure $P_{B1}$ is determined according to the conversion map which takes the characteristic in which the relationship between the command signal to the linear solenoid valve SL1 shown in FIG. 10, for example, and the output pressure is non linear into consideration.

Further in step S14, the correction is executed by adding that total command value to the base command value for outputting the engaging pressure $P_{B1}$ of the brake B1. Once the engaging pressure of a predetermined hydraulic frictional engagement device for an upshift has started, this type of hydraulic pressure correction is continued in real time, with priority given to the stability of the engagement hydraulic pressure control, even after the factor for changing the input torque of the automatic transmission 14 has stopped being generated.

In FIG. 12, at time $t_3$ the fuel cut control has already started so the hydraulic correction amount $\Delta P_{FC}$ for that fuel cut control is determined immediately, and that determined hydraulic pressure correction amount $\Delta P_{FC}$ is then added to the engaging pressure $P_{B1}$ to correct the engaging pressure $P_{B1}$. A decrease amount $\Delta D_{FC}$ of the command signal shown in FIG. 12 corresponds to that correction amount $\Delta P_{FC}$. Also, at time $t_4$, in addition to the fuel cut control, the air conditioner control starts so the hydraulic pressure correction amount $\Delta P_A$ for the air conditioner control is immediately determined, and a total correction amount $\Delta P (=\Delta P_{FC}+\Delta P_A)$, which is obtained by adding the hydraulic pressure correction amount $\Delta P_A$ for the air conditioner control to the hydraulic pressure correction amount $\Delta P_{FC}$ for the fuel cut, is determined. That total correction amount $\Delta P$ is then added to the engaging pressure $P_{B1}$ to correct the engaging pressure $P_{B1}$.

Next, in step S15, it is determined whether the power-off upshift control is complete based on whether the input shaft rotational speed $N_{IN}$ of the automatic transmission 14, i.e., the turbine rotational speed $N_T$, and the synchronized rotational speed, i.e., the rotational speed derived by multiplying the gear ratio $\gamma_2$ after the 1→2 upshift by the actual output shaft rotational speed $N_{OUT}$ of the automatic transmission 14, match. Because the determination in this step is NO at first, steps S2 and thereafter are repeatedly executed until the upshift is complete. When the determination in step S15 is YES, however, all of the flags are cleared to "0" in step S16 and the control routine ends.

Accordingly, with this exemplary embodiment, when the first determining means 102 determines that a predetermined upshift control has been started when the accelerator pedal 50 was not being operated and the second determining means 104 (steps S2 to S7) determines that a factor has been generated that changes the input torque $T_{IN}$ of the automatic transmission 14, the correction controlling means 114 (step S14) corrects the engaging pressure of the predetermined hydraulic frictional engagement device by the correction amount according to that factor. Therefore, even if a factor is generated that changes the output torque of the engine 10, undershooting of the engine speed NE, as well as shift shock that occurs due to that undershooting, can be preferably suppressed.

Further, according to this exemplary embodiment, the second determining means 104 (steps S2 to S7) determines that a factor that changes the input torque $T_{IN}$ of the automatic transmission 14 has been generated based on the fact that one or more of a) fuel cut control that cuts the fuel supply to the engine 10, b) air conditioner control that uses a compressor driven by the engine 10, and c) flex lockup clutch control that partially engages the lockup clutch 32 provided in the torque converter (fluid power transmitting device) 12 that is disposed between the engine 10 and the automatic transmission 14, has started. Accordingly, when it is determined that a factor that changes the input torque that is input to the automatic transmission 14 from the engine 10 has been generated due to the fact that one or more of the fuel cut control, the air conditioner control, and the flex lockup clutch control has been started, the correction controlling means corrects the engaging pressure of the predetermined hydraulic frictional engagement device by a correction amount in accordance with the factor that changes the input torque $T_{IN}$. As a result, even if a factor is generated that changes the output torque of the engine 10, undershooting of the engine speed NE, as well as shift shock that occurs due to that undershooting, can be preferably suppressed.

Further, the vehicular drive apparatus according to this exemplary embodiment includes the differential value determining means 108 (step S1) for determining whether the differential value ΔN between the input shaft rotational speed $N_{IN}$ of the automatic transmission 14 and the synchronized rotational speed is equal to, or less than, the preset determination value ΔN1, as well as the correction controlling means 114. The correction controlling means 114 corrects the engaging pressure of a predetermined hydraulic frictional engagement device after the differential value determining means 108 has determined that the differential value ΔN is equal to, or less than, the preset determination value ΔN1. Therefore, correction of the engaging pressure for a power-off upshift can be started at appropriate timing before synchronized rotation, thereby increasing the controllability of the engaging pressure.

Also, the vehicular drive apparatus according to this exemplary embodiment includes the determination value calculating means 106 for calculating the determination value ΔN1 based on the actual vehicle speed V from the pre-stored relationship shown in FIG. 8, for example. Further, the differential value determining means 108 determines whether the differential value ΔN is equal to, or less than, the preset determination value ΔN1. Accordingly, the engaging pressure of the predetermined hydraulic frictional engagement device is corrected after it has been determined that the differential value ΔN is equal to, or less than, the determination value ΔN1 calculated based on the vehicle speed V. As a result, correction of the engaging pressure for a power-off upshift can be started at appropriate timing according to the vehicle speed V, thereby increasing the controllability of the engaging pressure.

Also, the correction controlling means 114 corrects the engaging pressure of a predetermined hydraulic frictional engagement device for an upshift from after the differential value determining means 108 has determined that the differential value ΔN is equal to, or less than, the preset determination value ΔN1, until the input shaft rotational speed $N_{IN}$ of the automatic transmission 14 reaches the synchronized rotational speed. Accordingly, the correction period during which the engaging pressure is corrected starts after it has been determined that the differential value ΔN is equal to, or less than, the preset determination value ΔN1, and ends when the input shaft rotational speed $N_{IN}$ of the automatic transmission 14 reaches the synchronized rotational speed. As a result, correction of the engaging pressure is able to be performed for an appropriate period of time.

Further, the vehicular drive apparatus according to this exemplary embodiment includes the linear solenoid valve SL1 which has a characteristic in which the relationship between the command signal and the output pressure is non-linear, as shown in FIG. 10, for example, and which directly controls the engaging pressure of a predetermined hydraulic frictional engagement device to be engaged for the power-off upshift. When the second determining means 104 has determined that a plurality of factors that change the input torque of the automatic transmission 14 have been generated, the correction controlling means 114 adds the correction amounts corresponding to that plurality of factors and corrects the engaging pressure of the predetermined hydraulic frictional engagement device using the total command value determined based on the added correction amounts from that non linear characteristic. Accordingly, even if a plurality of factors that change the input torque are generated, undershooting of the engine speed NE, as well as shift shock that occurs due to that undershooting, can be preferably suppressed. Also, because the total command value is determined taking the non linear characteristic of the linear solenoid valve SL1 into consideration, the engaging pressure of the predetermined hydraulic frictional engagement device can be corrected with greater precision.

Further, the correction amount determining means 112 (correction controlling means 114) in this exemplary embodiment determines the correction amount based on the actual vehicle speed V from the pre-stored relationship shown in FIG. 9, for example, and corrects the engaging pressure of the predetermined hydraulic frictional engagement device by the correction amount determined based on that actual vehicle speed V. Accordingly, correction of the engaging pressure of the hydraulic engagement device that is engaged for a power-off upshift can be started at appropriate timing regardless of the vehicle speed V.

Also according to this exemplary embodiment, after the correction controlling means 114 has corrected the engaging pressure of a predetermined hydraulic frictional engagement device for a power-off upshift once, the correction controlling means 114 continues to correct the engaging pressure even after the factor for changing the input torque of the automatic transmission 14 has stopped being generated. As a result, stable controllability with respect to control of the engaging pressure during a power-off upshift is able to be realized.

Although the invention has been described herein with reference to specific embodiments, many modifications and variations therein will readily occur to those skilled in the art. Accordingly, all such variations and modifications are included within the intended scope of the invention.

For example, in the foregoing exemplary embodiment, a 1→2 upshift is described as one example of a power-off upshift. Alternatively, however, the power-off upshift may also be a 2→3 upshift, a 3→4 upshift, or a 4→5 upshift.

Also, in the exemplary embodiment, the determination value ΔN1 is calculated by the determination value calculating means 106 based on the actual vehicle speed V from the pre-stored relationship shown in FIG. 8, for example. Alternatively, however, that determination value ΔN1 may also be a constant value irrespective of the vehicle speed V.

Also, in the exemplary embodiment, the correction amount ΔP for the engaging pressure $P_{B1}$ of the brake B1 during a 1→2 upshift, for example, is determined by the correction amount determining means 112 (correction controlling means 114) based on the actual vehicle speed V from the pre-stored relationship shown in FIG. 9, for example. Alternatively, however, that correction amount ΔP may also be a constant value irrespective of the vehicle speed V.

Further in the exemplary embodiment, the automatic transmission 14 is a FF transverse mounted transmission with five forward speeds, which is constructed of a combination of three planetary gearsets 40, 42, and 46. Alternatively, however, the number of planetary gearsets which in combination make up the automatic transmission 14 may be a number other than three, and the automatic transmission 14 may also be a longitudinal mounted transmission for a FR (front engine, rear drive) vehicle, or the like, i.e., the automatic transmission 14 is not limited as far as it is a multiple stage transmission.

What is claimed is:

1. A hydraulic pressure control apparatus which executes a predetermined upshift by increasing an engaging pressure of a predetermined hydraulic frictional engagement device in a vehicular automatic transmission that shifts speeds by selectively engaging a plurality of hydraulic frictional engagement devices, comprising:

a first determining device that determines whether control for the predetermined upshift has been started while an accelerator pedal was not being depressed;

a second determining device that determines whether a factor that changes an input torque of the automatic transmission has been generated; and a controller that corrects the engaging pressure of the predetermined hydraulic frictional engagement device by a correction amount in accordance with the factor that changes the input torque when i) it has been determined by the first determining device that the control for the predetermined upshift has been started while the accelerator pedal was not being depressed, and ii) it has been determined by the second determining device that the factor that changes the input torque of the automatic transmission has been generated.

2. The hydraulic pressure control apparatus according to claim 1, further comprising a linear solenoid valve which directly controls the engaging pressure of the predetermined hydraulic frictional engagement device, wherein a relationship between a command signal to the linear solenoid valve and an output pressure controlled by the linear solenoid valve is non linear, and, when it has been determined by the second determining device that a plurality of factors that change the input torque of the automatic transmission have been generated, the controller adds the correction amounts corresponding to the plurality of factors and corrects the engaging pressure of the predetermined hydraulic frictional engagement device using a total command value determined based on the non linear characteristic and the added correction amounts.

3. The hydraulic pressure control apparatus according to claim 1, wherein the controller determines the correction amount based on an actual vehicle speed from a pre-stored relationship between a vehicle speed and the correction amount.

4. The hydraulic pressure control apparatus according to claim 1, wherein, after the controller has corrected the engaging pressure of the predetermined hydraulic frictional engagement device once, the controller continues to correct the engaging pressure even after the factor for changing the input torque of the automatic transmission has stopped being generated.

5. The hydraulic pressure control apparatus according to claim 1, wherein the second determining device determines that the factor that changes the input torque of the automatic transmission has been generated based on the fact that one or more of i) fuel cut control that cuts fuel supply to an engine, ii) air conditioner control that uses a compressor driven by the engine, and iii) lockup clutch control that fully or partially engages a lockup clutch provided in a fluid power transmitting device that is disposed between the engine and the automatic transmission, has started.

6. The hydraulic pressure control apparatus according to claim 5, further comprising a differential value determining device that determines whether a differential value between an input shaft rotational speed of the automatic transmission and a synchronous rotational speed is equal to, or less than, a preset determination value, wherein the controller corrects the engaging pressure of the predetermined hydraulic frictional engagement device after the differential value determining device has determined that the differential value between the input shaft rotational speed of the automatic transmission and the synchronous rotational speed is equal to, or less than, the preset determination value.

7. The hydraulic pressure control apparatus according to claim 6, further comprising a determination value calculating device that calculates the determination value based on an actual vehicle speed from a pre-stored relationship between a vehicle speed and the determination value, wherein the differential value determining device determines whether the differential value between the input shaft rotational speed of the automatic transmission and the synchronized speed is equal to, or less than, the determination value calculated by the determination value calculating device.

8. The hydraulic pressure control apparatus according to claim 6, wherein the controller corrects the engaging pressure of the predetermined hydraulic frictional engagement device from after it has been determined by the differential value determining device that the differential value between the input shaft rotational speed of the automatic transmission and the synchronized rotational speed is equal to, or less than, the preset determination value, until the input shaft rotational speed of the automatic transmission reaches the synchronized rotational speed.

9. The hydraulic pressure control apparatus according to claim 1, further comprising a differential value determining device that determines whether a differential value between an input shaft rotational speed of the automatic transmission and a synchronous rotational speed is equal to, or less than, a preset determination value, wherein the controller corrects the engaging pressure of the predetermined hydraulic frictional engagement device after the differential value determining device has determined that the differential value between the input shaft rotational speed of the automatic transmission and the synchronous rotational speed is equal to, or less than, the preset determination value.

10. The hydraulic pressure control apparatus according to claim 9, further comprising a determination value calculating device that calculates the determination value based on an actual vehicle speed from a pre-stored relationship between a vehicle speed and the determination value, wherein the differential value determining device determines whether the differential value between the input shaft rotational speed of the automatic transmission and the synchronized speed is equal to, or less than, the determination value calculated by the determination value calculating device.

11. The hydraulic pressure control apparatus according to claim 9, wherein the controller corrects the engaging pressure of the predetermined hydraulic frictional engagement device from after it has been determined by the differential value determining device that the differential value between the input shaft rotational speed of the automatic transmission and the synchronized rotational speed is equal to, or less than, the preset determination value, until the input shaft rotational speed of the automatic transmission reaches the synchronized rotational speed.

12. A control method for a hydraulic frictional engagement device of a vehicular automatic transmission, comprising:

determining whether control for a predetermined upshift has been started while an accelerator pedal was not being depressed;

determining whether a factor that changes an input torque of the automatic transmission has been generated;

correcting the engaging pressure of a predetermined hydraulic frictional engagement device by a correction amount in accordance with the factor that changes the input torque when i) it has been determined that the control for the predetermined upshift has been started while the accelerator pedal was not being depressed, and ii) it has been determined that the factor that changes the input torque of the automatic transmission has been generated; and executing the predetermined upshift by increasing the engaging pressure of the predetermined hydraulic frictional engagement device to the corrected engaging pressure.

13. A hydraulic pressure control apparatus, comprising:

a hydraulic pressure control circuit that controls an engaging pressure of a plurality of hydraulic frictional engagement devices in a vehicular automatic transmission so as to shift a speed thereof; and a controller that increases the engaging pressure of a predetermined hydraulic frictional engagement device by switching a hydraulic circuit in the hydraulic pressure control circuit when a predetermined upshift is executed, the controller including: a first determining device that determines whether control for the predetermined upshift has been started while an accelerator pedal was not being depressed, a second determining device that determines whether a factor that changes an input torque of the automatic transmission has been generated, and a correction device that corrects the engaging pressure of the predetermined hydraulic frictional engagement device by a correction amount in accordance with the factor that changes the input torque when i) it has been determined by the first determining device that the control for the predetermined upshift has been started while the accelerator pedal was not being depressed, and ii) it has been determined by the second determining device that the factor that changes the input torque of the automatic transmission has been generated.

* * * * *